No. 848,721. PATENTED APR. 2, 1907.
J. W. BUCK.
ATTACHMENT FOR HORSESHOES.
APPLICATION FILED MAR. 5, 1906.
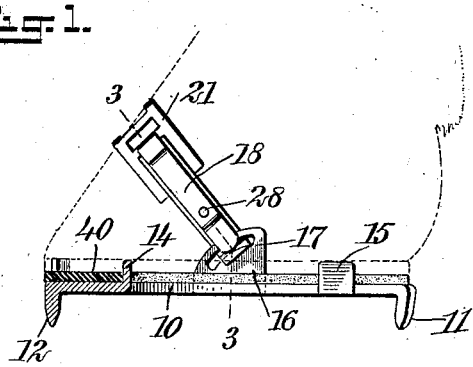
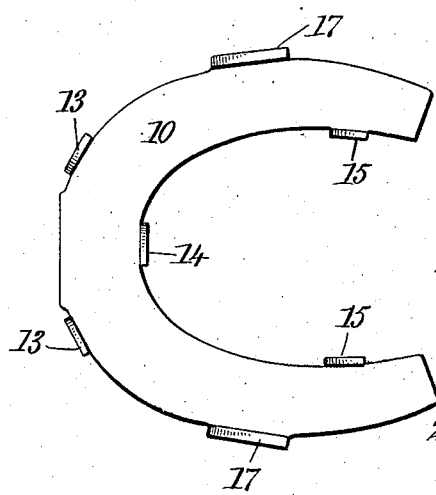
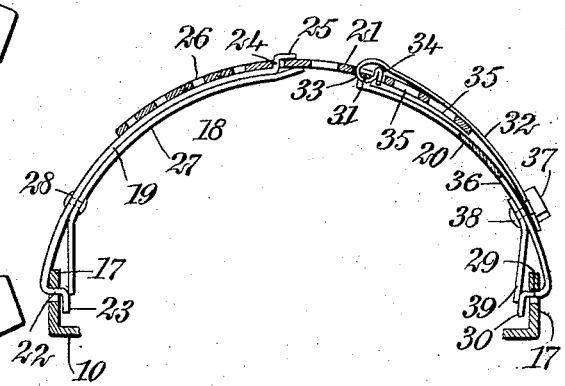
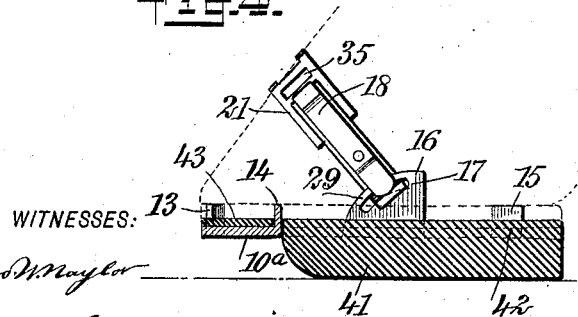
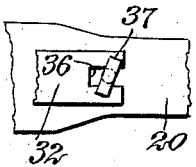
WITNESSES:
INVENTOR
James W. Buck
BY Munn & Co
ATTORNEYS

UNITED STATES PATENT OFFICE.

JAMES W. BUCK, OF NEW YORK, N. Y.

ATTACHMENT FOR HORSESHOES.

No. 848,721.  Specification of Letters Patent.  Patented April 2, 1907.

Application filed March 5, 1906. Serial No. 304,359.

*To all whom it may concern:*

Be it known that I, JAMES W. BUCK, a citizen of the United States, and a resident of the city of New York, borough of Manhattan, in the county and State of New York, have invented a new and Improved Attachment for Horseshoes, of which the following is a full, clear, and exact description.

My invention relates to an attachment for horseshoes, the principal objects thereof being to provide means for preventing slipping, said means being attachable over an ordinary horseshoe, and to provide means for securing it properly in position and adjusting it upon the hoof of the horse.

Further objects and advantages of the invention will appear below.

Reference is to be had to the accompanying drawings, forming a part of this specification, in which similar characters of reference indicate corresponding parts in all the figures.

Figure 1 is a central longitudinal sectional view of an attachment, illustrating my invention. Fig. 2 is a plan of the shoe-plate. Fig. 3 is a cross-section on the line 3 3 of Fig. 1. Fig. 4 is a cross-section similar to Fig. 1, but showing an antislip device of another form; and Fig. 5 is a view showing the outer face of a clamping-band and illustrating the means for securing the same.

The device is designed to be applied to the hoof of a horse over the ordinary shoe without disturbing the latter, and I have shown it in the form of a plate 10 in the general shape of a horseshoe. This plate is preferably made of iron, and the various projections from it are so located that they can all be formed integrally with the plate when the latter is stamped out, afterward being bent up or down, as the case may be, to afford the necessary antislipping surface and to provide means for securing the device in position on the horseshoe.

The antislipping devices are shown in the form of two heel-calks 11 and one toe-calk 12, integral with the attachment, as shown in Fig. 1. For the purpose of keeping the attachment in position it is provided with two front projections 13, located at the sides of the toe-calk and which prevent the shoe from slipping forward on the attachment, as the projections extend upwardly and engage the front surface of the shoe itself. At the rear of the toe-calk is another upwardly-extending projection 14, which assists in preventing motion in the opposite direction.

On the inside of the rear portions of the shoe are two upwardly-extending projections 15, designed to prevent sidewise motion of the attachment with respect to the shoe. These projections would ordinarily be sufficient to hold the attachment in position if some means were provided for securing it above the hoof of the horse. For this purpose and for the additional purpose of preventing sidewise motion of the attachment I have shown a pair of ears 16, extending upward from the two opposite sides of the attachment, and each of these ears is provided with a curved slot 17. To the ears 16 are attached the extremities of an adjustable band 18, formed of sections or bows 19 and 20, connected by a tongue 21. This band 18 is curved, as shown, so as to conform to the curvature of the hoof to which it is applied. The bow 19 at its lower extremity is offset inwardly, as shown in Fig. 3, so as to present a shank 22 and a laterally-disposed tip 23 therebeyond, which projects downwardly. This tip is adapted to be thrust through the slot in the ear and then downwardly, so as to engage the inner face of the ear to maintain the shank 22 in the slot, as indicated in Fig. 3. The upper end of the bow is similarly offset, so as to form a laterally-disposed shank 24 and a tip 25 therebeyond, as shown. The tongue 21 overlies the upper extremity of the bow 19 and is provided with a plurality of slots or eyes 26, extending transversely of the band. Any one of these eyes 26 may receive the shank 24, as shown in Fig. 3, the tip 25 lying against the outer side of the tongue. Near the lower extremity of the bow 19 I pivotally attach at 28 a keeper 27, said keeper consisting of a curved strip lying against the inner face of the bow 19. Its upper end is bent, as shown in Fig. 3, so as to engage the inner face of the tongue 21 opposite to the tip 25, and its lower portion engages the tip 23. The resiliency of this keeper tends to straighten it, so that when it is forced into the position shown it retains itself there.

The bow 20 is formed with an offset at its lower extremity, forming a shank 29 and a tip 30, similar to the corresponding parts of the bow 19. The bow 20 also presents a transverse bar 31, to which a clasp 32 is attached, as shown, the end of the clasp being bent around the bar to form a hinge-eye 33. Beyond this eye the material of the clasp is bent upon itself to form a cheek 34. The end of the tongue 21 which lies adjacent to the bow 20 is formed with a plurality of openings 35, and the free end of the clasp is intended to be passed through any one of these openings and then forced down against the outer side of the bow 20, as indicated in Fig. 3. When clasped in this way, the cheek 34 presses the edge of the opening in which the clasp is attached. In order to prevent accidental opening of the clasp, its extremity is formed with a slot 36, which receives a turn-button 37, as indicated in Figs. 3 and 5, said turn-button being formed with an elongated head which may clear or obstruct the slot, as will be readily understood. The pivot 38 of this turn-button attaches to the bow 20 a keeper 39, which extends downwardly and resiliently engages the tip 30, as shown, so as to retain the bow 20 on the ear 16, the action of this keeper being similar to that of the lower portion of the keeper 27. It will be noted that the openings 26 and 35 in the tongue 21 are of different sizes, the former being small and quite close together. This is to provide for adjustment, which can be secured by turning the plate end for end or by pulling up on one side and letting out on the other. I prefer to place between the attachment and the shoe a pad 40, of rubber, leather, steel, or any other suitable material, this pad conforming substantially to the shape of the under surface of the horseshoe and the upper surface of the attachment.

In Fig. 4 I illustrate a form of the invention in which the shoe-plate 10ª is formed without calks. Instead I use a cushion 41, of elastic or soft material. This cushion conforms to the shape of the horseshoe and the attachment on its outer surface and is provided with openings 42 to receive the projections 13, 14, and 15, and a thin flange 43 is formed at its edge, which lies between the shoe and the shoe-plate. This prevents slipping, as the surface which extends between the heels of the shoe rests on the ground. When a new shoe-plate or pad is to be substituted for an old one, the band 18 may be readily disconnected by releasing the keepers 27 and 39 and applied to another shoe-plate. The tongue 21 evidently enables accurate adjustments of the length of the band 18 to be made, and the curvature of the slots enables the band to adapt itself to various forms of hoofs.

Having thus described my invention, I claim as new and desire to secure by Letters Patent—

1. An attachment for horseshoes, comprising a plate of the general shape of a horseshoe, having heel and toe calks, a pair of projections on its front surface at the two sides of the toe-calk, a projection at the rear of toe-calk, and two projections near the heel-calks, all of said projections extending upwardly.

2. An attachment for horseshoes, comprising a plate of the general shape of a horseshoe, having heel and toe calks, a pair of projections on its front surface at the two sides of the toe-calk, a projection at the rear of the toe-calk, and two projections near the heel-calks, all of said projections extending upwardly, with a pair of attaching-ears extending upwardly from the outer sides of the plate, all of said projections the ears and the heel and toe calks, being formed integrally with the plate.

3. An attachment for horseshoes, comprising a plate having an outer surface corresponding to the shape of the horseshoe and provided with means for engaging the horseshoe, and preventing lateral motion thereof, said attachment also being provided with a pair of upwardly-extending ears, and a band detachably connected to said ears and adapted to pass around the hoof.

4. An attachment for horseshoes, comprising a plate having a pair of upwardly-extending ears at its sides, and a band for holding the attachment in position, said band comprising two members, each connected with one of said ears, and each having an offset engaging said ears, and a tongue adjustably connected with each of said members.

5. An attachment for horseshoes, comprising a plate having a pair of upwardly-extending ears and a band for holding the attachment in position, said band comprising two bows connected respectively with said ears, and each having a shank, and a tongue having openings receiving said shanks for connecting the said bows, the openings in said tongue being of two kinds, those at one end being wider than those at the other, and one of said shanks being pivoted with respect to the member to which it is attached.

6. An attachment for horseshoes, comprising a plate having an outer surface corresponding to the shape of the horseshoe, and provided with means for engaging the horseshoe and preventing lateral motion thereof, said attachment also being provided with a pair of upwardly-extending projections on its outside surface, said projections having slots, means attached in said slots for attaching the device to the hoof of a horse, and a cushion mounted between the attachment and horseshoe.

7. An attachment for horseshoes, comprising a plate of the shape of a horseshoe, and provided with upwardly-extending projections on its inner and outer edges at the toe and heel, and a band for holding the plate in position, said band comprising two members each having detachable connection with a projection of the plate, and a tongue adjustably secured to each of said members.

8. An attachment for horseshoes, comprising a plate of the shape of a horseshoe and provided with apertured ears at its sides, and a band for securing the plate to a shoe, said band comprising two members, each having an angular end in interlocking engagement with an ear of the plate, and a tongue adjustably connecting the members.

9. An attachment for horseshoes, comprising a plate of the shape of a horseshoe and provided with apertured ears, and a band for securing the plate to a shoe, said band comprising two members having angular ends engaging the apertured ears of the plate and a keeper for engaging the said angular end, and a tongue adjustably connecting the members of the band.

In testimony whereof I have signed my name to this specification in the presence of two subscribing witnesses.

JAMES W. BUCK.

Witnesses:
 JNO. M. RITTER,
 F. D. AMMEN.